US011240028B2

(12) United States Patent
Vigneron et al.

(10) Patent No.: US 11,240,028 B2
(45) Date of Patent: Feb. 1, 2022

(54) TRUST SERVICE ENGINE FOR EXTERNAL BLOCKCHAIN VERIFICATION

(71) Applicant: SAP SE, Walldorf (DE)

(72) Inventors: Francois Vigneron, Kehl am Rhein (FR); Saumyadipta Das, Bhubaneswar (IN); Soumya R, Bangalore (IN); Manjusha Nair, Bangalore (IN)

(73) Assignee: SAP SE, Walldorf (DE)

( * ) Notice: Subject to any disclaimer, the term of this patent is extended or adjusted under 35 U.S.C. 154(b) by 338 days.

(21) Appl. No.: 16/404,861

(22) Filed: May 7, 2019

(65) Prior Publication Data

US 2020/0358612 A1    Nov. 12, 2020

(51) Int. Cl.
*H04L 9/32*       (2006.01)
*G06F 21/64*      (2013.01)

(52) U.S. Cl.
CPC ............ *H04L 9/321* (2013.01); *G06F 21/645* (2013.01); *H04L 9/3263* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 2005/0228999 A1* | 10/2005 | Jerdonek | H04L 9/3268 713/176 |
| 2016/0267558 A1* | 9/2016 | Bonnell | G06Q 20/3827 |
| 2018/0150835 A1* | 5/2018 | Hunt | H04L 67/10 |
| 2020/0007344 A1* | 1/2020 | Chepak, Jr. | H04L 9/0643 |
| 2020/0084046 A1* | 3/2020 | Bessonov | H04L 9/3239 |
| 2020/0272619 A1* | 8/2020 | Alferov | G06Q 50/265 |
| 2021/0014065 A1* | 1/2021 | Gourisetti | H04L 9/3236 |

* cited by examiner

*Primary Examiner* — Christopher C Harris
(74) *Attorney, Agent, or Firm* — Buckley, Maschoff & Talwalkar LLC (57) ABSTRACT

Provided is a system and method for implementing remote trust services for blockchain. In one example, the method may include one or more of retrieving block content from a portion of a blockchain via an application programming interface (API), in response to a triggering event being detected, calling an off-chain trust service to sign the retrieved block content, receiving accreditation results of the retrieved block content from the off-chain trust service, the accreditation results comprising an indication of whether the retrieved block content has been successfully signed, and writing the received accreditation results to a block within the blockchain.

20 Claims, 7 Drawing Sheets

TRUST SERVICE ENGINE FOR EXTERNAL BLOCKCHAIN VERIFICATION

BACKGROUND

Blockchain is a relatively new database technology which provides a number of benefits with respect to a traditional centralized database. For example, in a centralized database a single entity is in control of the data. In contrast, in blockchain no single entity is in control of the data, but rather a decentralized group of peer nodes (typically untrusting parties) must agree before data can be added to the blockchain. As another example, the blockchain itself is stored on a distributed ledger that is replicated among the peer nodes making it fault-tolerant (does not have a single point of failure) which is not provided by a centralized database. As another example, blockchain is also secure because the blocks themselves are linked to one another with hashes creating an immutable ledger (tamper resistant).

Entities that participate in document-reliant industries such as accounting, tax reporting, data protection, product and safety compliance, etc., are required by law to ensure the authenticity of their data. Example legislation includes the US Sarbanes-Oxley Act and the EU directives 2010/45/EU, to name a few. The text of the legislation mention reliable audit trails as a way to ensure authenticity and integrity of data. Technical mechanisms to ensure the reliability of audit trails is not defined by law. Instead, the burden of proving the reliability of the audit trail relies on the owner of the data stored therein. These industries could benefit from the use of blockchain as a secure storage mechanism. However, at present, government or auditing entities would need to be participants of the blockchain in order for such audit trails to be trusted.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Industries (such as those with large amounts of documentation, images, etc.) can use blockchain as a secure way to store digital copies of the data (or hash representatives thereof). Data files can be added to the blockchain. As another example, hashes of the data files can be stored on the blockchain as proof while the actual data files may be stored in an off-chain storage that is managed via the blockchain using metadata of the location of the off-chain storage where the data is stored. Because of the benefits of blockchain with respect to traditional centralized storage, blockchain is quickly becoming an efficient way for parties to store their data.

However, implementing an audit trail (authentication of the data) on a blockchain has proven to be an obstacle. The technical mechanisms to ensure the reliability of audit trails is not defined by law, and can hardly be. Instead, the burden of proving the reliability of audit trails lies on audited organizations. They are left over with uncertainty as to whether the processes that they have defined, implemented and documented for audit trailing is reliable enough.

Storing audit trail information on blockchain arguably would level up the reliability of audit trails, e.g. by making it more difficult to manipulate individual trail records. However, operating such a blockchain purely for the purpose of audit trailing would have probative value only to the degree to which auditors trust blockchain participants. One could also argue that the government itself could operate a peer node within the blockchain system, but at present, no government is currently offering to store such details on a chain shared with external organizations. Also data protection concerns can be raised as to whether audit trail information should be shared at all. Even the mere counting of records might provide information to untrusting participants that audited businesses prefer to keep private.

The example embodiments are directed to a trust service engine that can be used to combine external trust services (remote off-chain entities) with blockchain. The trust service engine can retrieve data from the blockchain thereby exposing chosen block content for the external trust services even in a private/permissioned blockchain. Through the trust service engine, block content can be transferred to the remote trust services where an accreditation may be performed. Furthermore, results of the accreditation may be written to the blockchain by the trust service engine. The trust service engine may include one or more unique application programming interfaces (APIs) that enable the trust service engine to access the blockchain content and transfer the block content to the remote trust services in a secure manner. Similarly, the trust service engine may include one or more APIs that enable the trust services engine to write accreditation data from the remote trust services to the blockchain thereby creating an external accreditation as to the integrity of data stored on the blockchain. As a non-limiting example, the external accreditation may indicate an "authenticity of the origin" which includes assurance of the identity of chain participants or of their providers, an "integrity of the content" which indicates that the content required according to this external accreditation has not been altered, and the like. Therefore, the accreditation process may provide proof of integrity of the blocks within the blockchain, while an additional verification process may verify the content stored within the blocks of the blockchain.

The trust service engine for blockchain addresses the probative value of audit trails by combining blockchain technology and off-chain trust services through a consistent and consolidated mechanism. The trust service engine enhances the mere storing of audit trails on blockchain by externally accrediting data blocks on the blockchain and writing accreditation details back to the blockchain. The accreditation process may provide proof of the integrity of the blockchain structure, itself. For example, the accreditation process can verify that the block hashes (links between the blocks) are proper and that previous accreditation signatures stored on the blockchain are proper. A trigger may be initiated (e.g., periodically, conditionally, randomly, etc.) so that an external signature of block data from a distributed ledger (of a peer node) may be performed. In response, the trust service engine may read block data that has been stored on the blockchain, and transfer the block data to an external trust service (or services). Accreditation results by the trust service(s) may be provided to the trust service engine which can write the results into a block on the chain. Over time, the process can be iteratively repeated creating sub-chains (portions) of accreditation results.

Figure 1:
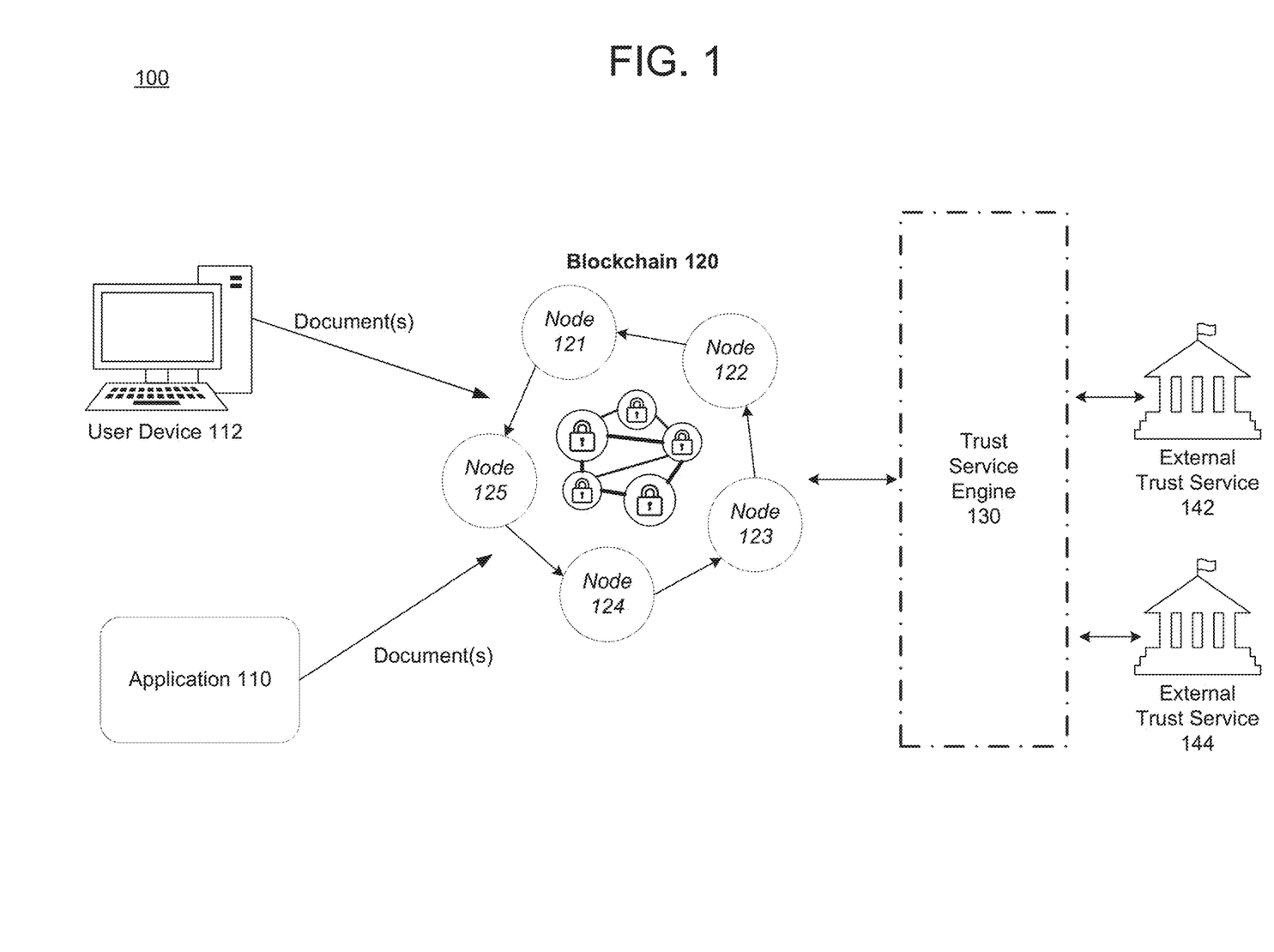
FIG. 1 is a diagram illustrating a computing environment including a trust service engine for blockchain in accordance with an example embodiment.

FIG. 1 illustrates a computing environment 100 including a trust service engine for blockchain in accordance with an example embodiment. Referring to FIG. 1, organizations (represented by application 110 and user device 112) may store documents, files, media, etc. on a blockchain 120. As non-limiting examples, the application 110 may include one or more enterprise resource planning (ERP) applications that can store client data, employee data, employer data, and the like (or hash representatives thereof), however, embodiments are not limited to any specific type of application. As another non-limiting example, the user device 112 may correspond to a workstation of a user such as an accountant, a clerk, a financial officer, a bank, etc., which stores documentation and other files on the blockchain 120.

In this example, the blockchain 120 may be a decentralized database (also referred to as a distributed storage system) which includes multiple nodes 121-125 that communicate with each other. The decentralized database includes an append-only immutable data structure resembling a distributed ledger capable of maintaining records between mutually untrusted parties. The untrusted parties are referred to herein as peers or peer nodes which are included in the nodes 121-125. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. A permissioned blockchain database provides secure interactions among a group of entities which share a common goal but which do not fully trust one another, such as businesses that exchange funds, goods, information, and the like.

The nodes 121-125 may perform a logical function and different types can run on the same physical server. The nodes 121-125 may be grouped into trust domains and associated with logical entities that control them in various ways. The nodes 121-125 may include different types, such as a client or submitting-client node which submits a transaction-invocation (document, etc.) to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

The chain itself may include a transaction log which is structured as hash-linked blocks, and each block contains a sequence of N transactions. A block header may include a hash of the block's transactions, as well as a hash of the prior block's header. In this way, all transactions on the ledger may be sequenced and cryptographically linked together. Furthermore, a hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

Referring again to FIG. 1, a trust services engine 130 communicates with one or more external trust services (142 and 144) and enables these trust services 142 and 144 with access to the blockchain 120. Here, the trust services engine 130 can retrieve content from one or more data blocks stored in a chain on the distributed ledger and transfer the retrieved data to the external trust services 142 and 144. For example, the block content may include content such as block numbers, hash content (current block, previous block, etc.), and the like, which can be used to validate the content stored on the blockchain 120. The external trust services 142 and 144 can use any known verification mechanism to accredit or verify the content of the block data stored on the blockchain 120 including validating hash links, hash content, etc. by recreating the hash using a public key, etc. In these examples, the external trust services 142 and 144 may not perform an "auditing" of the block content. Rather, they may sign block content that is presented to them which can be used as proof of integrity of the block content, itself.

In these examples, the external trust services 142 and 144 may sign block content and write the signature results back to blockchain (also referred to as accreditation). In doing so, the external trust services 142 and 144 may create verification points on the blockchain 120 (also referred to as accredited blocks). Electronic signatures from the external trust services 142 and 144 are a means to ensure the integrity and authenticity of electronic documents. Legislations across the world has defined conditions under which electronically signed documents can be seen as trustworthy. One such piece of legislation is the EU Regulation 910/2014 that lays down an exhaustive framework for the operation of qualified trust services within the European Union.

For example, the definition of article 3 of Regulation (EU) No 910/2014 of the European Parliament and of the Council of 23 Jul. 2014, describes a "'trust service' as an electronic service normally provided for remuneration which consists of:
  (a) the creation, verification, and validation of electronic signatures, electronic seals or electronic time stamps, electronic registered delivery services and certificates related to those services, or
  (b) the creation, verification and validation of certificates for website authentication; or
  (c) the preservation of electronic signatures, seals or certificates related to those services.

In the example embodiments, by extension, the trust services 142 and 144 may refer to providers that not only issue certificates, but also provide remote signature services compliant with local requirements. For the purpose of the examples herein, the holder of the certificate—although important in practice is not taken into account and considered not relevant for the processing of the trust service engine 130 for blockchain. Such trust services contribute to the probative value of signed data.

Figure 2:
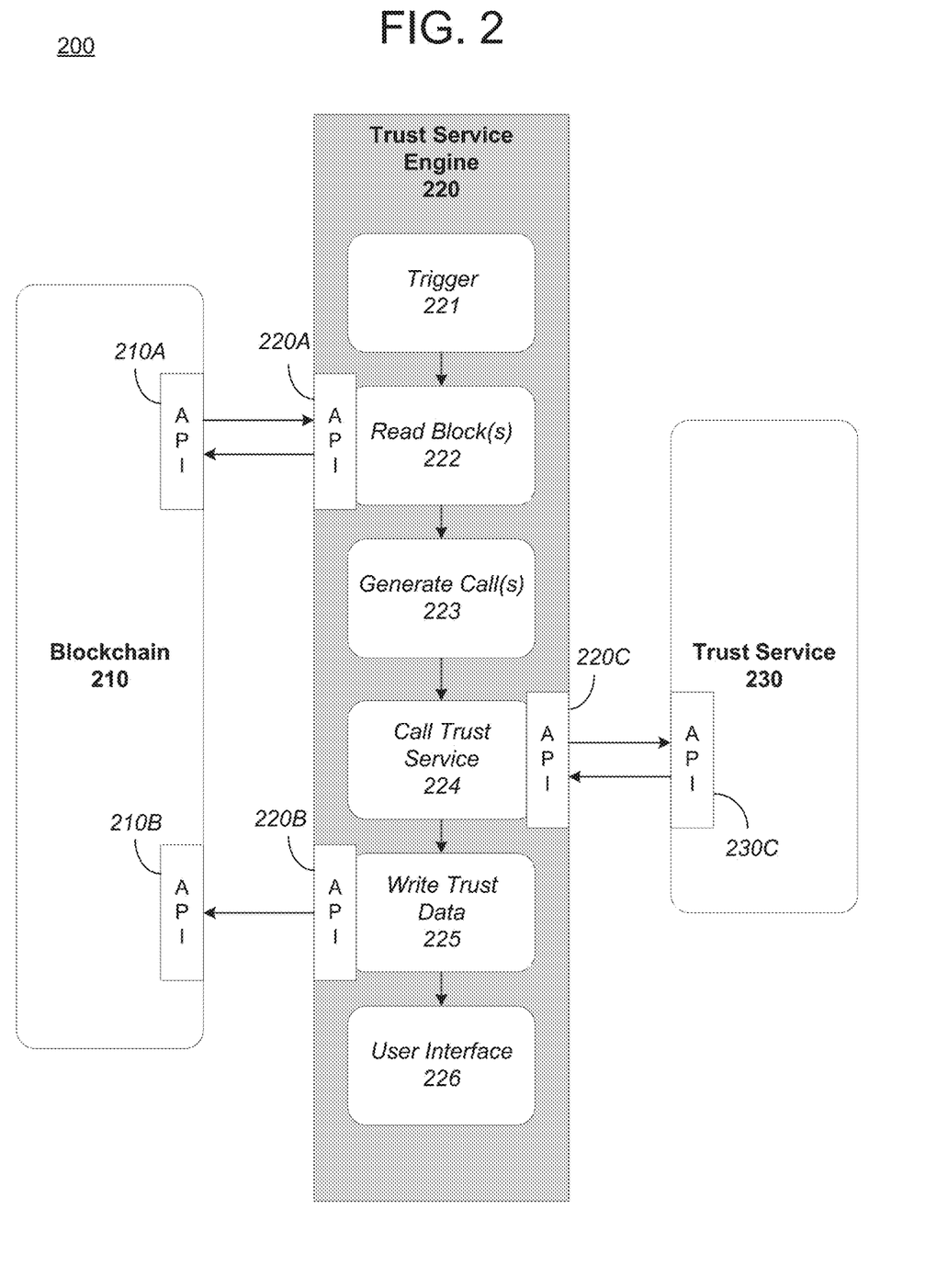
FIG. 2 is a diagram illustrating a process of implementing remote trust service for blockchain content in accordance with an example embodiment.

FIG. 2 illustrates a process 200 of implementing remote trust service for blockchain content in accordance with an example embodiment. Referring to FIG. 2, communication between a blockchain 210, a trust service engine 220, and a trust service 230 is shown. Here, the blockchain 210, the trust service engine 220, and the trust service 230 may correspond to the blockchain 120, the trust service engine 130, and the trust service 142 and/or 144 which are shown in FIG. 1. In this example, the trust service engine 220 may perform various operations such as operations 221-226, but embodiments are not limited thereto, nor is each of operations 221-226 required.

In this example, an external accreditation process may be triggered by a predefined event, in 221. For example, the event may be a timer-scheduler that, at given intervals (e.g. every x minute, every hour, day etc.), triggers the external accreditation process. As another example, the trigger may be a block counter that triggers accreditation every 10, 100, 1000, 10000 blocks, etc. The trigger may be a calendar-based time (e.g., present time/day). As another example, the trigger may be randomly generated.

In response to the trigger in 221, the trust service engine 220 reads block content of a defined block or blocks (e.g. the last block created, the $10^{th}$ block since last accreditation, the last block created before a given date, etc.) Here, the block content that is retrieved by the trust service engine 220 may include document data, hash data (previous block hash, current block hash, etc.), block number, and the like, which is relevant for accrediting a block. Optionally, further block or block content details might be added to strengthen the probative value or the details available e.g. at verification or to auditors. To enable the trust service engine 220 to access data from the blockchain 210, the trust service engine 220 may be implemented with an API 220A and the blockchain 210 may be implemented with a corresponding API 210A. The APIs 220A and 210A may enable the trust service engine 220 to read blocks of data from the blockchain 210.

In 223, the information that is read is then prepared by the trust service engine 220 for calling the trust service 230 (or multiple trust services). For each trust service 230, the preparation by the trust service engine 220 may include creation of a signature request based on the capabilities, specifications and/or signature type supported by the target trust service 230. For example, the request can be a file containing a credential, signature instructions such as the certificate to use and the actual chain of characters to be hashed (or if applicable a hash of it), and the like.

In this example, in 224 the trust service 230 is called and sends back signature results. For example, the signature results may include accreditation information indicating whether the block data has been signed successfully, by whom, and when, thereby providing integrity to the block data. Meanwhile, in 225 the trust service engine 220 writes the signature results along with all relevant details required to verify the trust service signature to the blockchain 210. At a minimum a block number or an identification of the "accredited" block is stored within an "accrediting block" along with the related signature results. Processing information of the trust service engine 230 can be added to the accreditation information, e.g. processing accreditation ID and processing time.

To perform the call of the trust service 230 in 224, the trust service engine 220 may include another API 220C (and the trust service 230 may include a corresponding API 230C) which can be used to call the trust service 230. The API 220C and the API 230C may be designed to comply with the specification of the related trust services. These types of APIs also enable verifying accredited blocks when this service is provided by trust services and configured in the administration. Furthermore, the trust service engine 220 may include another API 220B (and the blockchain 210 may include a corresponding API 210B) which enables the trust service engine 220 to write accreditation data to the blockchain 210.

In some embodiments, the trust service engine 220 may also output a user interface in 226 that enables an auditor or other user to review accreditation information created by the trust service 230 for content that are stored on the blockchain 210. As another example, the user interface 226 may be output to an operator, etc., which enables the operator to perform trust service engine configuration.

The applications that are used to store data on the blockchain 210 may be referred to as trailed applications. The trailed applications can be, for example, consumer or business applications such as enterprise resource planning (ERP) systems or any application that can benefit from (more) reliable audit trails e.g. in areas such as accounting, banking, product management, human resources, intellectual property, logistics, customs and transport, tax and archiving, and the like. Although not shown in FIG. 2, the blockchain 210 may include another API that is used by the trailed application or the related blockchain interfacing middleware to store documents to the blockchain 210.

The trust service engine 220 supports the accreditation of any type of underlying blockchain and of any data model used by the blockchain 210. In some embodiments, the trust service engine 220 can be set up with minimum requirements to the data models of underlying chains. The existence of block content such as block number, block hash and hash of previous block are sufficient for setting up an accreditation logic. The block information can be structured in any manner supported by the data model of the underlying blockchain service. In practice, several documents or the trailing details of several documents can be put into one block without impacting the trust service engine 220. To simplify the verification of accredited blocks, the data model of the underlying chain might be extended for adding enhanced functionalities to the trust service engine such as by adding specific token types and/or block types.

The trust service engine 220 supports the configuration of multiple blockchains. All applicable configurations of the trust service engine 220 may be stored in an administration user interface (such as output in 226) than enables users with administrator roles to define, for a given blockchain, its accreditation logic. The accreditation logic may include triggering events and the calls of external trust services. For example, triggering events can be created with a scheduler starting the accreditation at given intervals (e.g. every x minute, every hour, day, week, month, year, etc.) As another example, a calendar can be used to trigger the accreditation at given times (e.g. every Monday at 00:00 UTC, every first day of the month) or precise dates. As another example, a block counter that counts block on accredited chains can trigger accreditation each x block (e.g. every 10, 100, 1000, 10000 block. etc.). As another example, a call of by an underlying chain, e.g. informing that a specific chain event requires accreditation by the trust service engine 220 may be the trigger.

In some embodiments, the external trust service 230 can be a signature service provider recognized by local authorities as trustworthy such as an eIDAS (electronic Identification, Authentication and trust Services) 'qualified trust service provider' as defined in Regulation (EU) No 910/2014 of the European Parliament and of the Council of 23 Jul. 2014. As another example, the external trust service 230 can be a signature service provider seen as trustworthy by the organization or the service provider operating the trust service engine 220 or by their advisors, auditors or local authorities.

The related signature certificate used by the external trust service 230 to sign can be specific to the organization consuming the trailed application, specific to the organization or the service provider operating the trust service engine 220, a third-party that they or local authorities designate (such as a notary, public accountant, lawyer, executory officer, accredited service provider, etc.), and the like. For a given triggering event, one or several trust services shall be specified along with the type of action to perform such as a signature, signature and verification, and/or verification. For the purpose of raising probative value, the accreditation logic can combine certificates of different validity dates in different jurisdictions.

The runtime execution of the trust service engine 220 may run all configured and activated accreditation logic settings and logs related calls and their results. To further strengthen accrediting capabilities, the trust service engine 220 might store accreditation details for a given underlying chain such as, a number of blocks accredited on that chain (in total, by time interval, etc.), the block numbers for blocks actually accredited and/or accrediting, specific block details that can be re-used for verification such as the block number and block hashes of accredited and non-accredited blocks or Merkle trees of them, and the like.

Figure 3A:
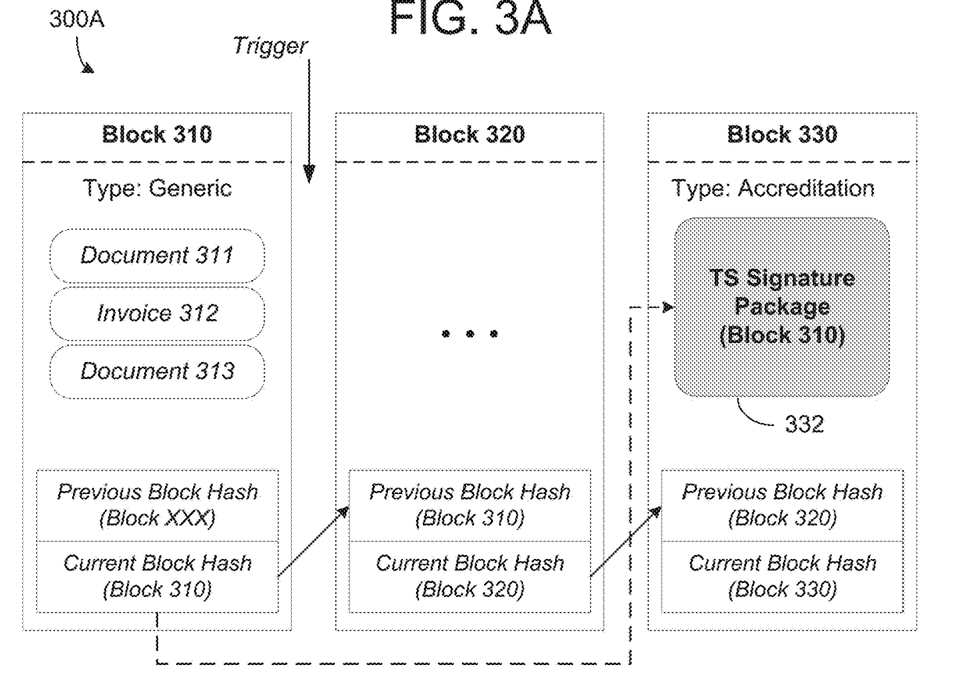
FIGS. 3A and 3B are diagrams illustrating examples of storing accreditation data on a blockchain in accordance with an example embodiment.
Figure 3B:
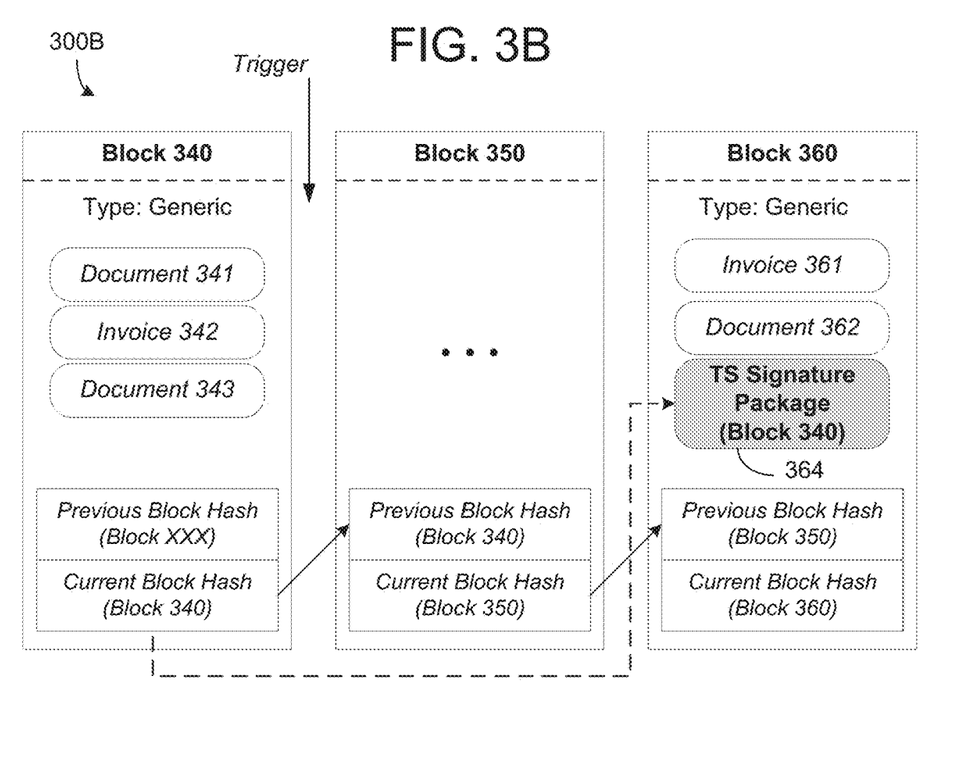

FIGS. 3A and 3B illustrate examples of storing accreditation data on a blockchain in accordance with an example embodiment. Referring to FIG. 3A, a process 300A of storing accreditation data within a unique accreditation block 330 is shown. In this example, blocks 310, 320, and 330 are consecutive blocks on a blockchain (not shown). Each of the blocks are linked to a previous block using a hash thereof. For example, block 320 includes a hash of previous block 310 as well as a hash of the block 320. The hash of the previous block 310 will include a hash of content that is stored in the block 310 such as document 311, invoice 312, and document 313. In this example, the trust service engine may receive a trigger to accredit the block 310. In response, the trust service engine may retrieve hash content such as a block number, a hash of a previous block, a hash of a current block, etc., from the block to be accredited, and provide this information to an external trust service. In response, the external trust service may provide an accreditation result of the block 310 which may include an electronic signature of the trust service.

In the example of FIG. 3A, the block 310 is a generic block in that it can store document content provided to the blockchain. Meanwhile, a unique accreditation block 330 can be used to store the accreditation results of the external trust service. Here, the content of the block 330 may include a signature package 332 with accreditation results of block 310 received from the external trust service which is written to the block 330 by the trust service engine. In this example, accreditation data is stored in a separate block on the chain. The block 310 which is being accredited is referred to herein as an accredited block. Meanwhile, the block 330 storing the accreditation results is referred to herein as an accrediting block because it is being used to provide an accrediting of another block on the chain.

FIG. 3B is similar to FIG. 3A in that three blocks 340, 350, and 360 are linked together using hashes. Here, block 340 includes document 341, invoice 342, and document 343. In this example, a trigger is received and an accreditation of block 340 is performed. For example, the trust service engine may retrieve content from the block 340 including hash data, block number, block content, etc. and pass this information to the external trust service Similar to the process in FIG. 3A, the trust service engine may receive a signature package from the external trust service with accreditation results of the block 340. However, in this example, the trust service engine may store a signature package 364 into a generic block 360 instead of a unique accreditation block. In this case, the generic block 360 may also store trailing application content such as an invoice 361 and document 362 (or hash representatives thereof).

The trust service engine also supports the verification of chains by the verification or re-verification of the chaining integrity and of their accredited blocks. Chaining integrity may be verified by checking the integrity of the chain by standard blockchain verification mechanism, the integrity of accredited blocks (which have already been externally accredited), the consistency of accredited/accrediting block pairs, and the like. In addition, the trust service engine may log accredited block details.

The verification of accredited blocks may be done by verifying individual block signatures which may include reading the trust service tokens/packages on the chain (such as trust service (TS) signatures 332 and 364 shown in FIGS. 3A and 3B), finding the related accredited blocks, retrieving the accreditation relevant information from accredited blocks (e.g. the hash of blocks, etc.), recreating the signature input related to the trust services used for accreditation, verifying the input against the signed versions of it, if necessary by calling an external signature verification service. If all accredited blocks in a selected time frame can be verified and the chain is also reported to be integer, the information on chain can be presumed trustworthy.

Figure 4A:
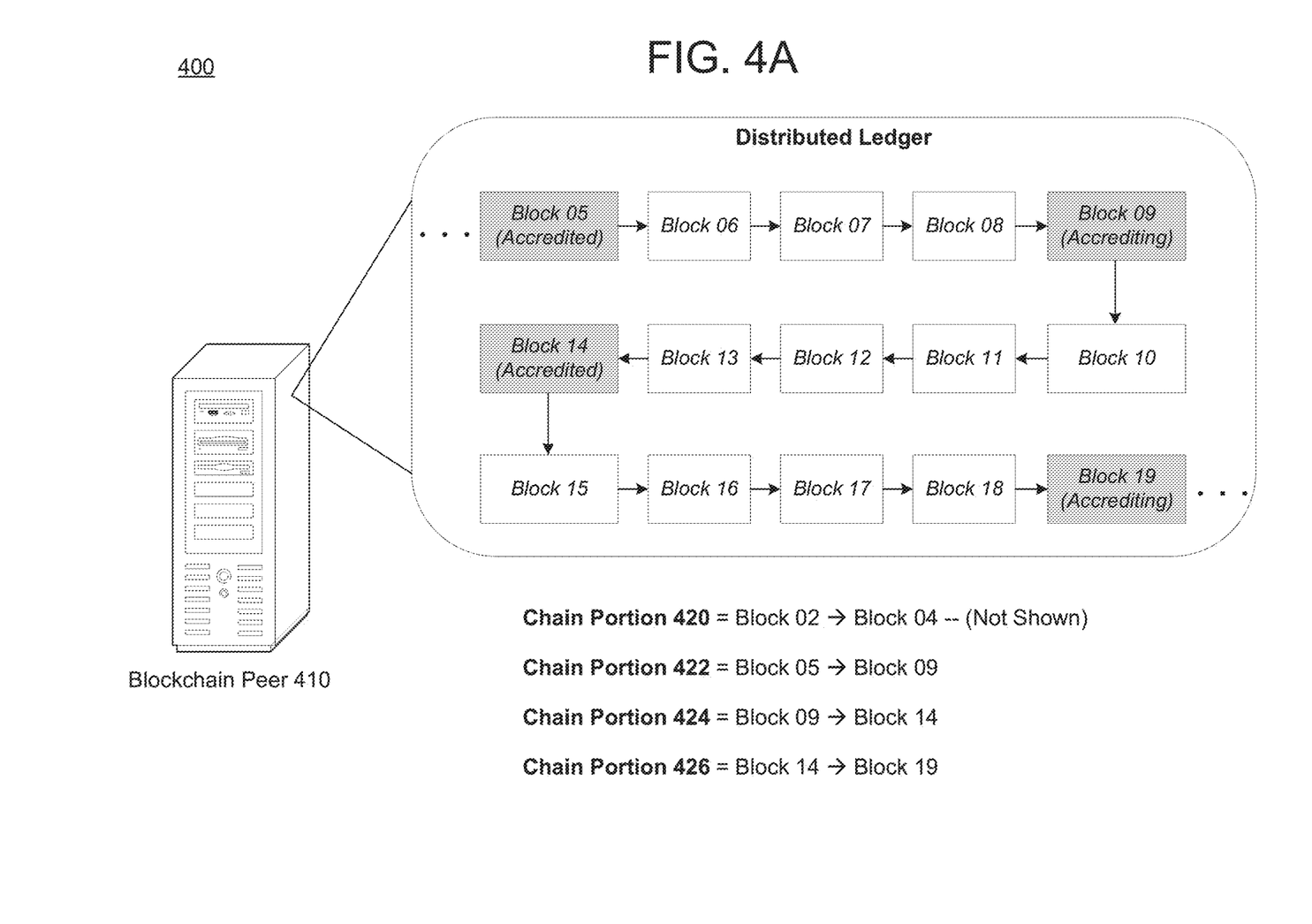
FIGS. 4A and 4B are diagrams illustrating accreditation results of sub-chains in accordance with an example embodiment.
Figure 4B:
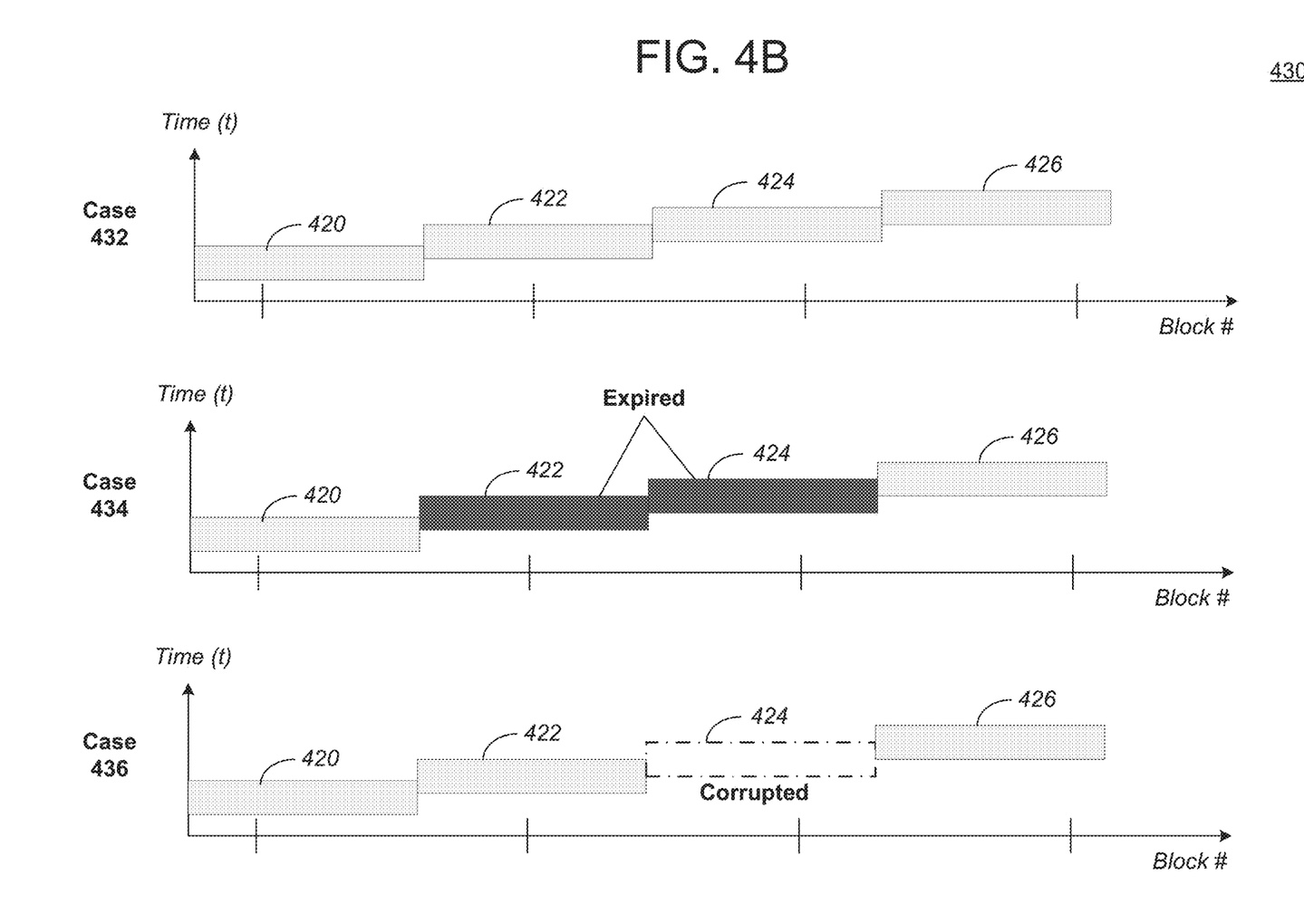

FIGS. 4A and 4B illustrates accreditation results of chain portions (sub-sections of blocks on the blockchain) in accordance with an example embodiment. Referring to FIG. 4A, a process 400 includes four triggers creating four different chain portions 420 (not shown in FIG. 4A), 422, 424, and 426 which are accredited from within a larger chain. The trigger mechanism described by the example embodiments enables portions of blocks to be verified at a time, rather than having to accredit an entire chain. In this example, the trust service engine may receive a trigger and read block data recorded since a last accredited block on the blockchain.

In the example of FIG. 4A, a second trigger causes the trust service engine to read block data from block 05 (accredited block). Results of the external accreditation process (TS signature package) are stored in block 09 (accrediting block). This process is repeated for a plurality of additional chain portions including 426 with block 14 being accredited and block 19 accrediting 424. In this example, at the time of reading block 05 (which is a future accredited block), block 06 is not yet in existence. However, at the writing of the signature package, the block 06 has been further added to the blockchain. In other words, between the reading of the block content and the storing of the signature package, additional block(s) may be added to the chain.

In this example, chain portion 422 is between an accredited block 05 and an accrediting block 09. Here, integrity of the chain portion can be derived from (i) block 05 being validated against the external trust service signature and (ii) the integrity of the chain portion itself between block 05 and block 09. Meanwhile, chain portion 426 is between an accredited block (14) and an accrediting block (19). As for chain portion 422, chain portion 426 integrity can be derived from (i) block 14 being validated against the external trust service signature and (ii) the integrity of the chain portion itself between block 14 and block 19. In addition, chain portion 424 is between an accrediting block 09 and an accredited block 14. Portion integrity can be derived from the integrity of the chain portion itself between block 09 and block 14. Furthermore, chain portion 424 is also located between two accredited blocks 05 and 14. Therefore, chain portion 424 also indirectly benefits from these external accreditations.

FIG. 4B illustrates a user interface 430 displaying accreditation results in accordance with an example embodiment. For example, the user interface 430 is shown with three different example cases 432, 434, and 436. In the first case 432, the three chain portions 422, 424, and 426 are each verified. However, in the event that a signature cannot be verified for technical reasons such as shown in case 434, because a signature certificate originally used has expired, the verification result by the trust service engine shall report an impossibility to verify the individual block against a given certificate and display the reasons. In this example, block 09 is not able to be verified externally because the certificate associated therewith has expired. Therefore, chain portions 422 and 424 which include block 09 are marked as expired. However, the chain portion 420 which is prior to the expired certificate is still rated as OK.

In some cases, the system may also output the certificate validity and a validity time frame. This can be done in a graphical manner, with the validity time frame of individual certificates used for a given accredited blockchain displayed on a time line with e.g. a color code making their status visible (e.g. green="certificate is valid and verified", grey="certificate expired", red="certificate is valid and signature did not verify").

Meanwhile, in the third case 436, the chain portion 424 is determined to be corrupted. Here, the trust service engine determines that the blockchain integrity of chain portion 424 has been compromised. Chain-level integrity for blocks 05 to 19 is rated as corrupted even though all accredited blocks (05 and 14) might still validate. The compromising of chain portion 424 can result from validation errors, for example, failure to verify the chain based on the hash content between the blocks in the chain portion 424, failure to verify the integrity of an accredited block (block 14) in chain portion 424, and the like.

When the trust service engine accredits an underlying blockchain operated on a single-node, that chain can be seen as more sensitive to attacks. No chain copy and no consensus mechanisms are available to prevent and reveal such frauds. Consensus mechanisms are typically designed to avoid collision attacks. In a collision attack, the content of an individual block is modified while keeping the same hash value. Such attacks require (i) access to the chain, (ii) high computing power and (iii) can be made unlikely by further design choices. The trust service engine described herein may not itself prevent or detect collision attacks, but does force an attacker into conducting one in order to remain undetected. Forcing an attacker into such a resource-consuming attack has extremely high dissuasive effect. Furthermore, introducing multiple node operation would make even more unlikely that such attacks can be conducted.

Figure 5:
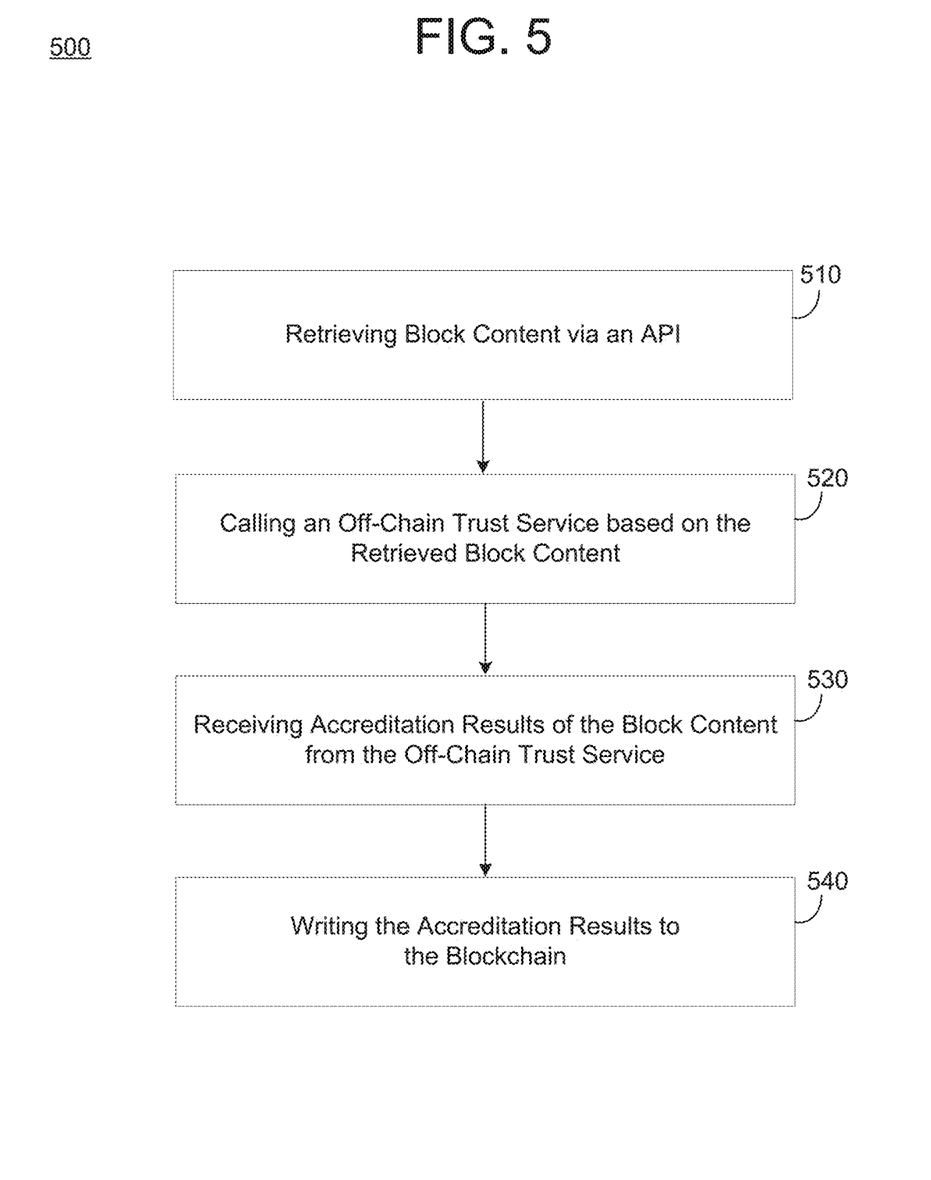
FIG. 5 is a diagram illustrating a method of implementing remote trust service for blockchain content in accordance with an example embodiment.

FIG. 5 illustrates a method 500 of implementing remote trust service for blockchain content in accordance with an example embodiment. For example, the method 500 may be performed by a database node, a cloud platform, a server, a computing system (user device), a combination of devices/nodes, or the like. Referring to FIG. 5, in 510, the method may include retrieving block content from a portion of a blockchain via an application programming interface (API), in response to a triggering event being detected. Here, the block content may include hashes, block numbers, content, metadata, and the like, which have been stored since a most recent accreditation process. The API may enable the trust service engine to read data from the blockchain, despite not being a party to the blockchain. In some embodiments, the triggering event may include at least one of a predefined number of blocks being created since a last accreditation, a predetermined amount of time expiring since a last accreditation, a predefined time occurring, a call from a blockchain service, and the like.

In 520, the method may include calling an off-chain trust service to sign the retrieved block content. For example, the trust service engine may generate a signature request based on one or more specifications supported by the off-chain trust service, and transmit the signature request via a second API to the off-chain trust service. For example, the signature request may include a file containing signature instructions including a certificate to use and a chain of characters to be hashed by the off-chain trust service.

In 530, the method may include receiving accreditation results of the retrieved block content from the off-chain trust service, the accreditation results comprising an indication of whether the retrieved block content has been successfully signed, and in 540, the method may include writing the received accreditation results to a block within the blockchain. In some embodiments, the received accreditation results may include an identification an accredited block and an identifier of the off-chain trust service that performed the accreditation. In some embodiments, the writing by the trust service engine may include writing the received accreditation results to a generic block on the blockchain that also includes content from other participants of the blockchain. As another example, the writing by the trust service engine may include writing the received accreditation results to a unique accreditation block that stores accreditation results without storing content from other participants of the underlying blockchain.

Figure 6:
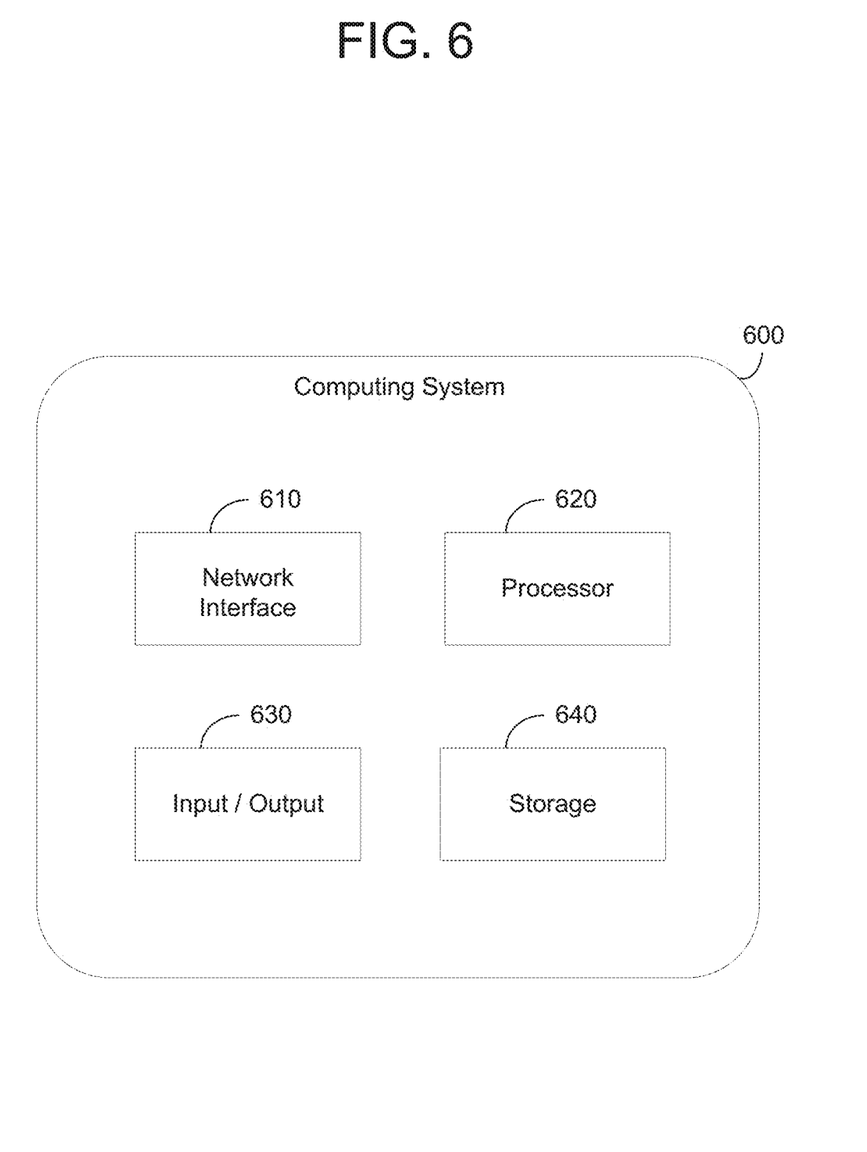
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, partitions and sub-partitions. The storage 640 may be used to store database records, items, entries, and the like. In some embodiments, the storage 640 may be configured to store instructions for implementing a trust service engine as described herein, which when executed, cause the processor 620 to carry out the functionality of the trust service engine.

According to various embodiments, the network interface 610 may retrieve block content from a portion of a blockchain via an application programming interface (API), in response to a triggering event. The processor 620 may call an off-chain trust service to verify the retrieved block content, receive accreditation results of the retrieved block content from the off-chain trust service, where the accreditation results comprise an indication of whether the retrieved block content has been successfully verified and write the received accreditation results to a block within the blockchain.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a memory storing program instructions; and
processor coupled to the memory and configured to execute the program instructions, wherein when executed the program instructions cause the processor to:
retrieve block content from a portion of a blockchain via an application programming interface (API), in response to a triggering event,
call an off-chain trust service to sign the retrieved block content, receive accreditation results of the retrieved block content from the off-chain trust service, where the accreditation results comprise an indication of whether the retrieved block content has been successfully signed, and write the received accreditation results to a block within the blockchain.

2. The computing system of claim 1, wherein the triggering event comprises at least one of a predefined number of blocks being created since a last accreditation, a predetermined amount of time expiring since a last accreditation, a predefined time occurring, and a call from a blockchain service.

3. The computing system of claim 1, wherein when executed the program instructions further cause the processor to retrieve block content, block hashes, and block numbers from one or more blocks among a hash-linked chain of blocks on the blockchain since a last accreditation.

4. The computing system of claim 1, wherein when executed the program instructions further cause the processor to generate a signature request based on one or more specifications supported by the off-chain trust service, and transmit the signature request to the off-chain trust service via a second API.

5. The computing system of claim 4, wherein the signature request comprises a file that contains signature instructions that include a certificate to use and a chain of characters to be hashed by the off-chain trust service.

6. The computing system of claim 1, wherein the received accreditation results comprise an identification of an accredited block and an identifier of the off-chain trust service that performed the accreditation.

7. The computing system of claim 1, wherein when executed the program instructions further cause the processor to write the received accreditation results to a block on the blockchain that also includes content from other participants of the blockchain.

8. The computing system of claim 1, wherein when executed the program instructions further cause the processor to write the received accreditation results to an accreditation block that stores accreditation results without storing content from other participants of the underlying blockchain.

9. The computing system of claim 1, wherein when executed the program instructions further cause the processor to call a signature verification service to audit the accreditation results written to the blockchain.

10. The computing system of claim 9, wherein the signature verification service is called to verify an external trust service signature stored within a block and an integrity of a chain portion between an accredited block and an accrediting block.

11. A method comprising:

retrieving block content from a portion of a blockchain via an application programming interface (API), in response to a triggering event being detected;

calling an off-chain trust service to sign the retrieved block content;

receiving accreditation results of the retrieved block content from the off-chain trust service, the accreditation results comprising an indication of whether the retrieved block content has been successfully signed; and writing the received accreditation results to a block within the blockchain.

12. The method of claim 11, wherein the retrieving comprises retrieving block content, block hashes, and block numbers from one or more blocks among a hash-linked chain of blocks on the blockchain since a last accreditation.

13. The method of claim 11, wherein the calling comprises generating a signature request based on one or more specifications supported by the off-chain trust service, and transmitting the signature request via a second API to the off-chain trust service.

14. The method of claim 13, wherein the signature request comprises a file containing signature instructions including a certificate to use and a chain of characters to be hashed by the off-chain trust service.

15. The method of claim 11, wherein the received accreditation results comprise an identification of an accredited block and an identifier of the off-chain trust service that performed the accreditation.

16. The method of claim 11, wherein the writing comprises writing the received accreditation results to a block on the blockchain that also includes content from other participants of the blockchain.

17. The method of claim 11, wherein the writing comprises writing the received accreditation results to an accreditation block that stores accreditation results without storing content from other participants of the underlying blockchain.

18. The method of claim 11, further comprising calling a signature verification service to audit the accreditation results written to the blockchain.

19. The method of claim 11, wherein the signature verification service is called to verify an external trust service signature stored within a block and an integrity of a chain portion between an accredited block and an accrediting block.

20. A non-transitory computer-readable medium comprising instructions which when executed by a processor cause a computer to perform a method comprising:

retrieving block content from a portion of a blockchain via an application programming interface (API), in response to a triggering event being detected;

calling an off-chain trust service to sign the retrieved block content;

receiving accreditation results of the retrieved block content from the off-chain trust service, the accreditation results comprising an indication of whether the retrieved block content has been successfully signed; and writing the received accreditation results to a block within the blockchain.

* * * * *